Oct. 1, 1935.  H. KING ET AL  2,016,204
POTATO SORTING AND WEIGHING MACHINE
Filed July 21, 1932  4 Sheets-Sheet 4

Inventors
H. King.
L. Wyse.
By Lacey & Lacey, Attorneys

Patented Oct. 1, 1935

2,016,204

UNITED STATES PATENT OFFICE 2,016,204

POTATO SORTING AND WEIGHING MACHINE

Harvey King and Leland Wyse, Archbold, Ohio

Application July 21, 1932, Serial No. 623,889

7 Claims. (Cl. 249—57)

This invention relates to sorting and weighing machines and has for an object to provide apparatus for grading onions, potatoes, and other fruits and vegetables, and delivering a certain size to a weighing and bagging apparatus in one continuous operation.

A further object is to provide apparatus for filling one bag while a filled bag is being removed and replaced with an empty bag.

A further object is to provide weighing apparatus for deflecting the stream of potatoes to the empty bag when a predetermined weight of potatoes has accumulated in the bag being filled.

A further object is to provide a novel clutch actuating a gate at predetermined times to deflect the stream of potatoes from one weighing platform to the other weighing platform.

A still further object is to provide novel bag holders for holding the bags wide open so as to be easily filled.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

Figure 1:
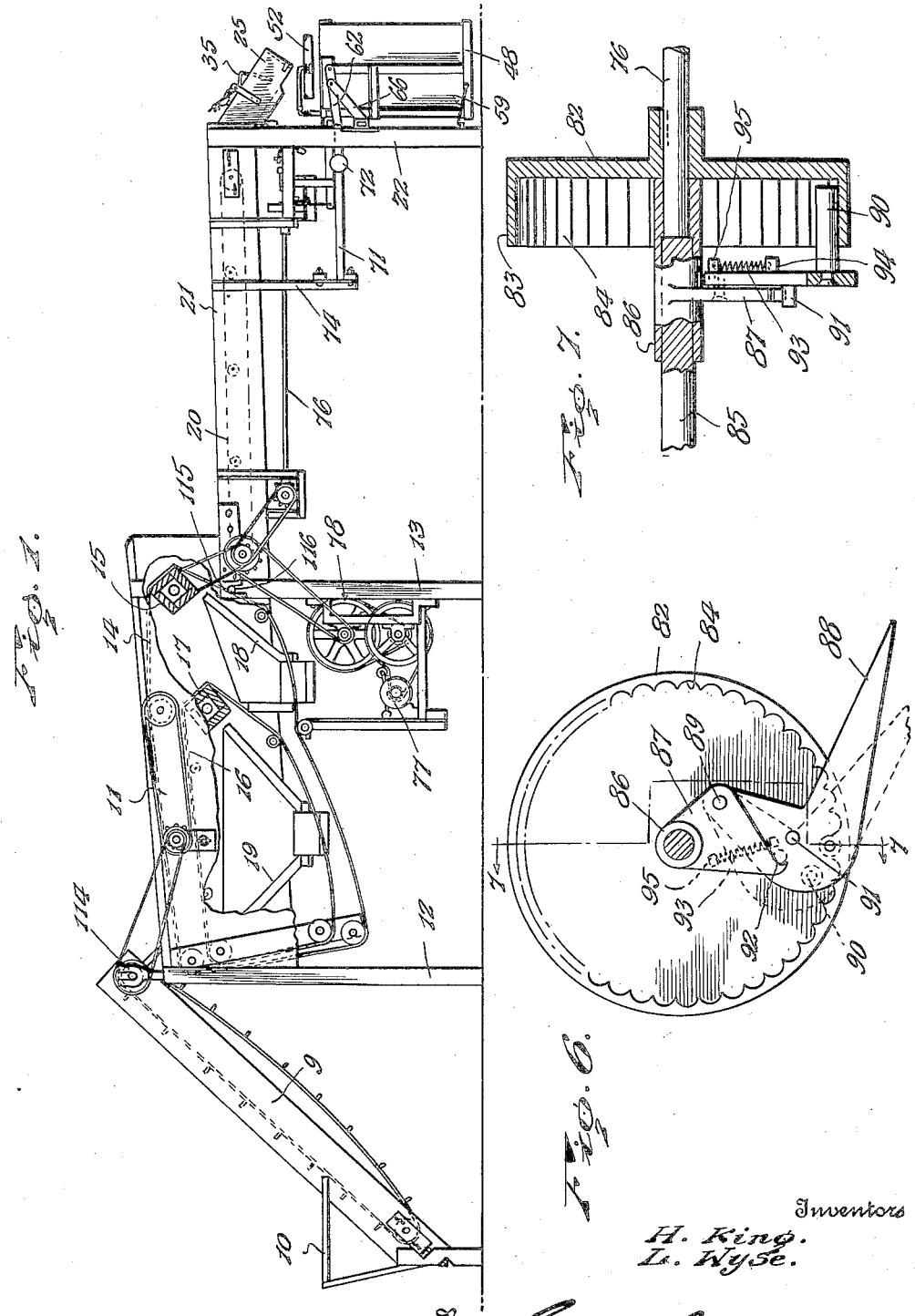
Figure 2:
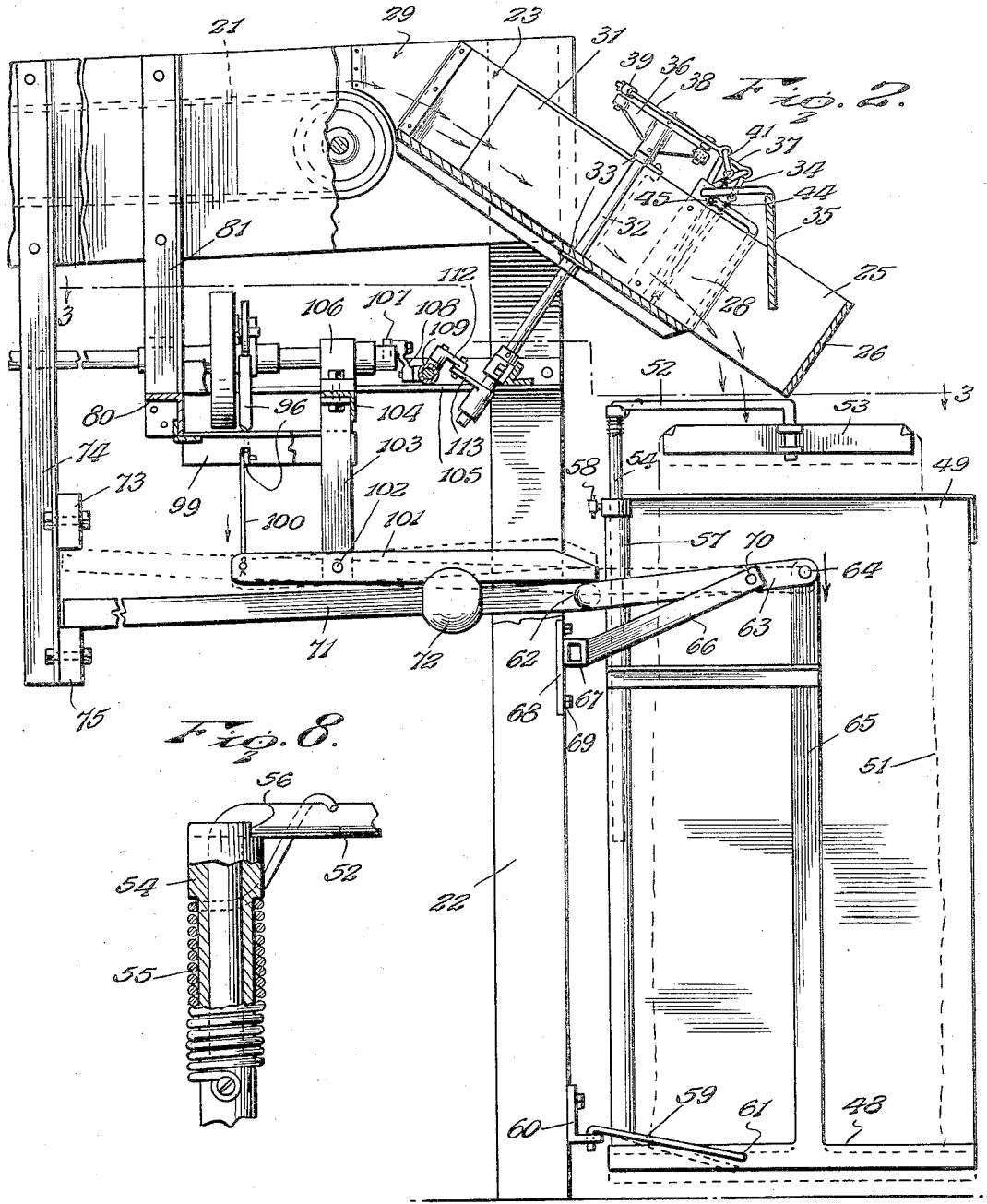
Figure 3:
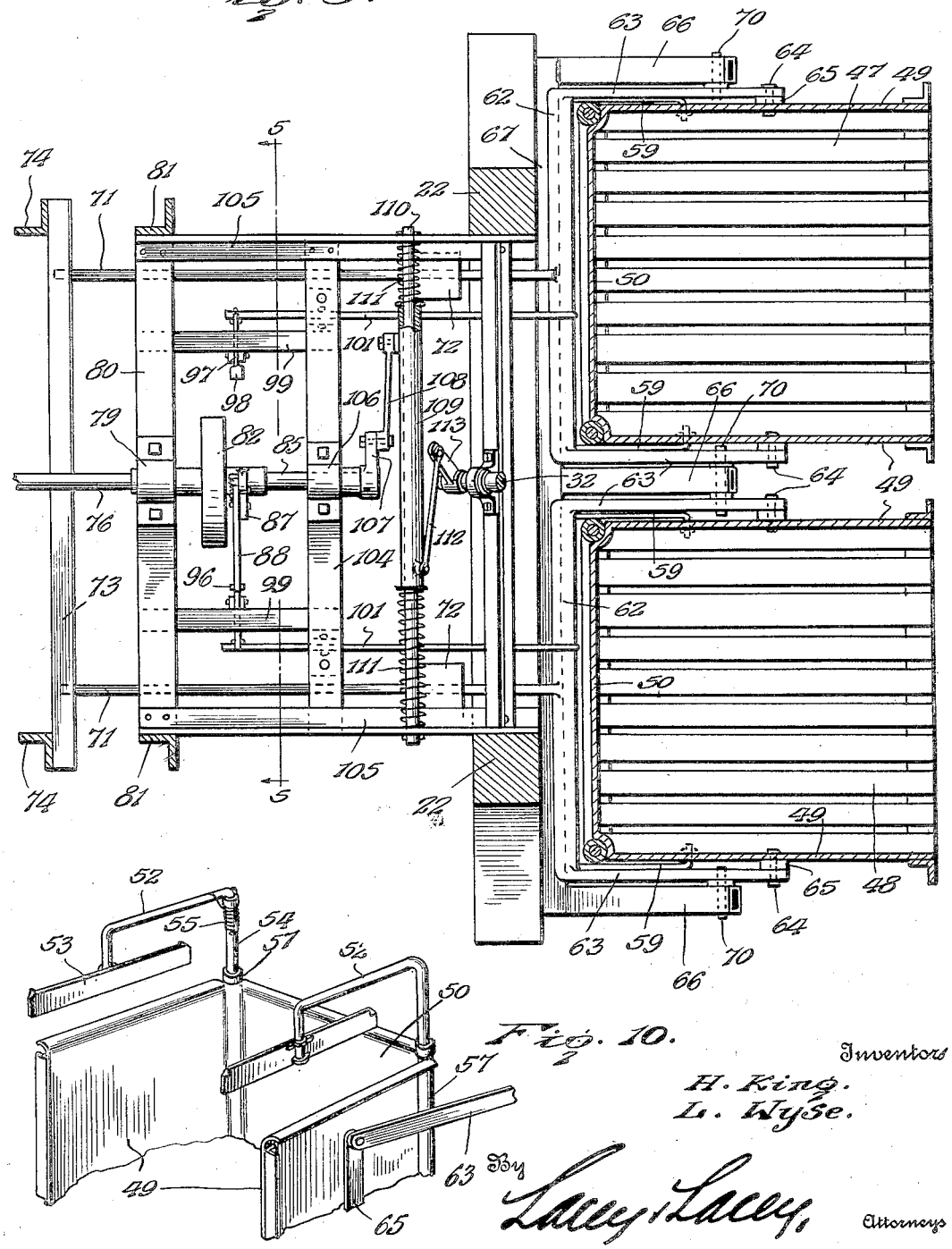
Figure 4:
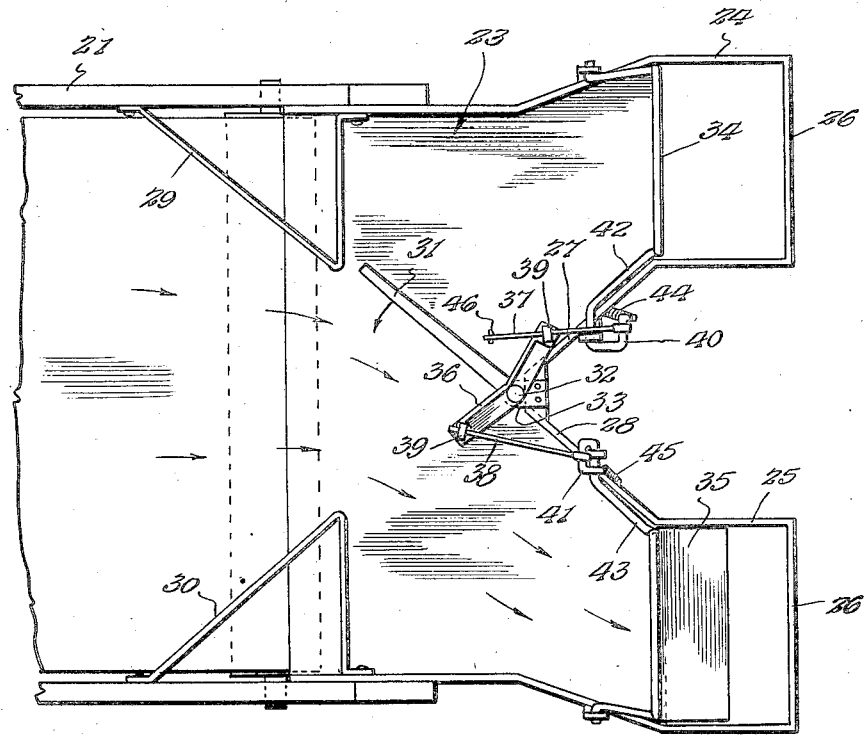
Figure 5:
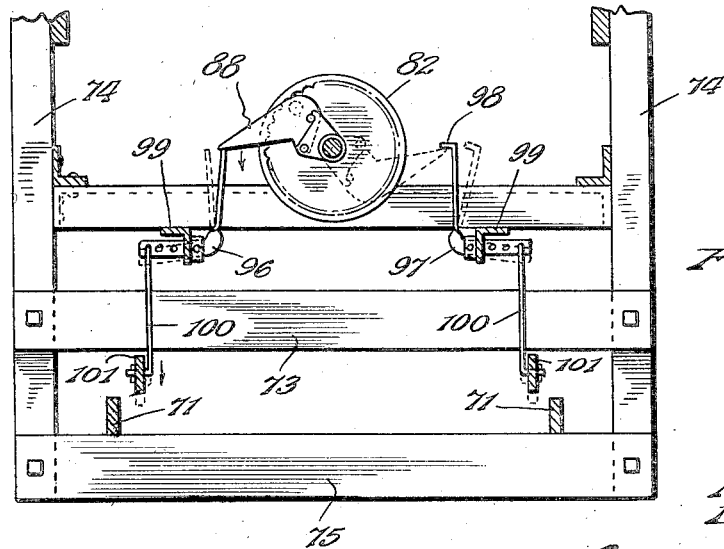

In the accompanying drawings forming part of this specification,

Figure 1 is a side elevation of the machine,

Figure 2 is an enlarged side elevation of the bagging and weighing apparatus, and of the filling chute with parts in section, Figure 3 is a cross section taken on the line 3—3 of Figure 2, Figure 4 is a plan view of the filling chute shown in Figure 2, Figure 5 is a cross section taken on the line 5—5 of Figure 3, Figure 6 is a front elevation of the clutch, Figure 7 is a cross section taken on the line 7—7 of Figure 6, Figure 8 is a detail section of one of the bag holders, Figure 9 is a plan view of the parts shown in Figure 8, and Figure 10 is a fragmentary perspective view of the bag holder carried by one of the weighing platforms.

Referring now to the drawings in which like characters of reference designate similar parts in the various views, 9 designates an endless elevator upon which the potatoes may be dumped from a platform 10.

The sorting apparatus comprises a casing 11 which is supported upon posts 12 and 13 at the delivery end of the elevator. A wire mesh conveyor belt 14 is driven by a square mandrel 15 and receives the potatoes from the elevator. The belt is vibrated by the mandrel and the size of the wire mesh is such that the large potatoes will be carried along by the belt and discharged into the bagging and weighing apparatus, hereinafter described, while the smaller potatoes will gravitate on to a similar vibratory wire mesh conveyor belt 16 which is arranged in the casing within the enclosure of the first described belt and is driven by a square mandrel 17.

The smaller potatoes gathered by the belt 16 are discharged into a hopper 18 from which they pass out of the machine. A similar hopper 19 collects the still smaller potatoes which pass through the wire mesh of the conveyor belt 16 and delivers them out of the machine.

The large potatoes are delivered by the conveyor belt 14 on to the endless apron 20 of a conveyor 21 which is supported at the discharge end by posts 22 and at the intake end by the posts 13 of the sorting apparatus.

By referring to Figures 2 and 4, it will be seen that a delivery chute 23 is secured to the discharge end of the conveyor 21. The delivery chute is branched at the lower end to provide a pair of spouts 24 and 25. These spouts are disposed in spaced relationship on opposite sides of the central axis of the chute and are open at the bottom, as shown in Figure 2, but are closed at the lower ends by end walls 26. Diverging side walls 27 and 28 direct the stream of potatoes toward the spouts. A pair of substantially V-shaped deflectors 29 and 30 are secured to the side walls of the conveyor 21 and to the side walls of the chute and serve to condense the stream of potatoes and direct the condensed stream to the delivery spouts.

The deflector 30, it will be noted, is in alignment with the inclined side wall 27 of the spout 24, while the deflector 29 is in alignment with the inclined side wall 28 of the delivery spout 25. A gate 31 is fixed to a pivot shaft 32 that is journaled in bearings 33 disposed at the apex of the inclined walls 27 and 28. When the pivot shaft is turned in one direction the deflector 29, gate 31 and inclined wall 28 of the spout 25 will be in alignment and the stream of potatoes will be deflected into the spout 25. When the pivot shaft is rotated in the opposite direction the deflector 30, gate 31 and inclined wall 27 of the spout 24 will be in alignment and the stream of potatoes will be deflected into the spout 24. The purpose of this is to permit the filling of a bag of potatoes on one weighing platform through one of the spouts, while a filled bag is being manually removed from the other weighing platform, as will presently be described in detail.

For controlling the delivery spouts 24 and 25 doors 34 and 35 are hinged at the tops to drop transversely across the delivery spouts, as shown in Figure 2, and when in such closed position prevent discharge of potatoes through the delivery spout. The doors are operated oppositely to each other, that is, when one is open the other will be closed, and for this purpose a V-shaped rock lever 36 is fixed at the apex to the pivot shaft 32. Rods 37 and 38 are mounted for limited sliding movement in eyes 39 disposed on the terminals of the lever 36. The low ends of the rods 37 and 38 are pivoted to respective cranks 40 and 41 formed integral with the hinge pintles 42 and 43 of the doors 34 and 35. Helical springs 44 and 45 are also secured to the cranks and to the inclined side walls of the delivery spouts and normally hold the doors closed.

When the pivot shaft 32 is rocked, the lever 36 will be correspondingly moved through an arc whereupon one of the eyes will engage a stop pin 46 on the corresponding rod and open the corresponding door. In practice, when the gate 31 is swung to the position shown in Figure 4, the door 35 will be opened by the rod 38. When the gate is swung in the opposite direction the door 34 will be opened by the rod 37. The delivery spouts 24 and 25 are superposed above weighing platforms 47 and 48 which are substantially square in plan, as best shown in Figure 3. Each platform is provided with vertical side walls 49 and a vertical back wall 50 between which the bag 51, to be filled, is held supported in open position upon the platform by means of bag holders, best shown in Figure 10, which will now be described.

Each bag holder comprises an arm 52 which carries a cross bar 53 adapted to support and hold the mouth of the bag spread open. The arm of one holder is integral with a post 54 carried at the adjacent rear corner of the platform. The arm of the other holder is pivoted on its post 54, as shown in Figure 8. A spring 55 encircles the post and bears against the pivoted arm to normally hold the arm urged outwardly. A shoulder 56, on the post, engages the arm and limits outward swinging movement thereof. Both posts 54 are adjustably mounted in hollow posts 57 which rise from the platform. A set screw 58 secures each post 54 in each adjusted position in the hollow post 57.

As an open bag fills with potatoes the platform is permitted to drop a slight distance, and for this purpose pivot links 59 are secured to brackets 60 carried by the posts 22 and are pivotally connected to the side edges of the platform, as shown at 61 in Figure 2. The weighing platform is supported at the top by a yoke 62, the branches 63 of which extend along the side walls 49 and are terminally pivoted, as shown at 64, to upright bars 65 that are integral with said side walls. Inclined bracket arms 66, preferably three in number, are carried by a common cross bar 67, as best shown in Figure 2, which cross bar is provided with attaching plates 68, best shown in Figure 2, which are bolted, as shown at 69 to the posts 22. Pivot pins 70 are passed through the free ends of the inclined arms 66 and through the branches 63 of the yokes 62.

Each yoke 62 is provided with a centrally disposed lever 71 upon which a ball weight 72 is mounted to slide. The ball 72 is of sufficient weight to counterbalance the weight of the weighing platform and hold the same at its upper limit of movement. As the bag fills, obviously the platform will sink and the yoke 62 will be rocked up on its pivots 70 until the end of the lever 71 impinges against a stop bar 73 which is secured to a hanger 74 carried by the side walls of the conveyor 21. Such upward movement of the yoke is utilized to engage the clutch with the power to operate the gate 31 and the doors 34 and 35, as will presently be described. Downward movement of the end of the lever 71 is limited by a stop bar 75, carried by the hanger 74.

By now referring to Figure 1, it will be seen that a drive shaft 76 is supported longitudinally underneath the conveyor 21 and is driven by a gas or electric motor 77 through a reduction train of pulleys and belts, designated in general by the numeral 78. The front end of the drive shaft is journaled in a bearing 79 on a cross bar 80 which is secured to hangers 81 carried by the conveyor 21, as best shown in Figure 3. Keyed to the end of the drive shaft, as shown in Figure 7, is a disk clutch member 82 having a flange 83 on one side which is provided internally with notches 84.

A driven shaft 85 is provided with an integral sleeve 86 which projects beyond the end of the driven shaft and journals the end of the drive shaft 76. The sleeve 86 is provided with an integral substantially triangular crank 87, best shown in Figure 6. An L-shaped dog 88 is pivoted at the end of one of its arms to one corner of the crank by means of a pivot pin 89. The dog is provided on one side with a roller 90 adapted to seat in the notches 84 of the disk clutch member 82. On its opposite side the dog is provided with a stop pin 91, as best shown in Figure 7. The stop pin is adapted to seat against a curved tooth 92 formed on the crank 87, the stop pin being spaced from the tooth normally by means of a compression spring 93 disposed between the lugs 94 and 95 carried respectively by the dog and the crank, in which position of the parts the spring moves the roller 90 into engagement with one of the notches 84 and the drive shaft is clutched to the driven shaft, as shown in Fig. 6.

It will be observed, by referring to Figure 5 that the dog 88 projects beyond the disk 82 substantially tangentially to the periphery of the disk. Disposed in the path of the dog is a pair of bell crank levers 96 and 97, the latter having a hook 98 at its upper extremity. When the dog 88 is lodged against the bell crank 96 it will be rocked on its pivot to hold the roller 90 disengaged from the disk clutch member 82. However, when the bell crank is rocked to the dotted line position, the dog 88 is free and is immediately rocked on its pivot by the spring 93 to engage the roller 90 in one of the notches of the disk clutch member 82 and clutch the driven shaft to the drive shaft.

Upon the driven shaft making approximately one-half revolution the dog 88 encounters the hook 98 and is thereby rocked on its pivot against the tension of the spring to retrieve the roller 90 from its seat in one of the notches 84 of the drive disk 82 so that the driven shaft is declutched from the drive shaft. Upon the bell crank 97 being rocked on its pivot to withdraw the hook 98 from the dog, the dog will be freed to again be moved by its spring to engage the roller 90 in one of the teeth in the drive disk 82 and clutch the driven shaft to the drive shaft for approximately another one-half revolution.

The bell cranks 96 and 97 are pivoted on short longitudinal bars 99 carried by the above mentioned bar 80. As best shown in Figures 2 and 5, the free ends of the bell cranks adjustably receive vertically disposed links 100, the lower ends of which are pivotally connected to rock levers 101 that are pivoted, as shown at 102, intermediate the ends to the lower ends of posts 103 that extend downwardly from a cross bar 104, as shown in Figures 2 and 3. The cross bar 104 is supported at the ends by longitudinal bars 105 which are secured to the posts 22 and the hangers 81, respectively.

The pivoted levers 101 extend with their free ends in engagement with the yokes 62, as best shown in Figure 3. Consequently when the yokes are rocked on their pivots 70 in the direction of the arrow head, shown in Figure 2, the levers 101 will be rocked on their pivots 102 to move the links 100 in the direction of the arrow head and rock the bell cranks 96 and 97 to free the dog 88 of the clutch and clutch the driven shaft to the drive shaft, as above explained.

Movement of the driven shaft is imparted to the pivot shaft 32 which operates the gate 31 and doors 34. For this purpose, as best shown in Figures 2 and 3, the end of the driven shaft 85 projects beyond its bearing 106 and is equipped with a crank 107. The crank is equipped with a pitman 108 which is pivotally connected to a sleeve 109 that is mounted to slide on a rod 110 carried by the longitudinal bars 105. Sliding movement of the pitman is resisted by springs 111 confined between the ends of the sleeves 109 and the bars 105 so that shocks and jars are reduced to a minimum.

The sliding sleeve 109 also carries a link 112 on the opposite side of its center from the pitman 108. The link 112 is connected to a crank 113 which in turn is mounted upon the lower end of the pivot shaft 32. Consequently during one-half revolution of the drive shaft the sleeve will be moved in one direction and the pivot shaft 32 will be correspondingly moved to operate one of the chute doors and the gate 31. During the remaining half cycle of the driven shaft the sleeve will be moved in the opposite direction to correspondingly move the pivot shaft 32 and operate the gate 31 and the other door of the chute. It will thus be seen that when one bag 51 has been completely filled the corresponding weighing platform 53 will be depressed and thereby trip the corresponding lever 101 to free the corresponding bell crank from the dog 88, whereupon the gate is swung to deflect the stream of potatoes to the opposite chute at the same time opening said opposite chute door and permitting the chute door over the filled bag to be closed by its controlling spring. The operator may now remove the filled bag while the bag on the opposite weighing platform is being filled.

By adjusting the weights 72 longitudinally of the lever 71 any desired weight of potatoes may be bagged although ordinarily, in the position shown in Figure 2, the weights will permit about sixty pounds of potatoes being bagged. The weights may be moved toward the free ends of the arms 71 to bag one hundred twenty pounds, if a bag of two-bushel capacity must be filled.

It will be observed, by referring to Figure 1, that the endless elevator is mounted on forks 114 to permit of the elevator being detached for transportation. Also the endless conveyor 21 is provided with hooks 115 which engage over pins 116 carried by the posts 13 to permit of the conveyor, as well as the bagging and weighing mechanism being detached from the sorting casing 11 for transportation or storage.

From the above description it is thought that the construction and operation of my invention will be fully understood without further explanation.

What is claimed is:

1. Packing and weighing apparatus including a delivery chute terminating in spaced spouts, weighing means disposed adjacent said spouts, a rock shaft extending upwardly through the chute, a gate carried by said shaft within the chute and movable by the shaft to deflect material to said spouts alternately, and a slidably mounted sleeve adapted to be reciprocated transversely of the chute adjacent the shaft and operatively connected with the lower end portion of the shaft for turning said shaft on its axis.

2. Packing and weighing apparatus including a delivery chute terminating in spaced spouts, weighing means disposed adjacent said spouts, doors for closing the spouts, a rock shaft extending upwardly through the chute, a gate carried by said shaft within the chute and movable by the shaft to deflect material to the spouts alternately, lost motion connections between the upper end portion of the shaft and said doors for opening the doors alternately as the shaft is oscillated, and a member adapted to be reciprocated transversely of the chute adjacent the shaft and operatively connected with the lower end portion of said shaft for turning the shaft on its axis.

3. Packing and weighing apparatus including a delivery chute terminating in spaced spouts, a rock shaft extending upwardly through the chute, a gate carried by said shaft within the chute and movable by the shaft to deflect material to said spouts alternately, a drive shaft, an aligned driven shaft, a member operatively connected to the driven shaft and to the rock shaft and adapted to be reciprocated transversely of the chute for oscillating the rock shaft as the driven shaft is rotated, resilient means at the ends of the member for cushioning endwise movement of the member, a clutch between said drive shaft and the driven shaft constantly urged to automatically connect said drive and driven shafts to turn in unison, weighing platforms adjacent the spouts, and means actuated by said platforms for intermittently rendering the clutch inactive.

4. Packing and weighing apparatus including a delivery chute terminating in spaced spouts, weighing means disposed adjacent said spouts, a rock shaft extending upwardly through the chute, a gate carried by said shaft within the chute and movable by the shaft to deflect material to said spouts alternately, a slidably mounted member adapted to be reciprocated transversely of the chute adjacent the shaft and operatively connected with the lower end portion of the shaft for turning said shaft on its axis, and means for cushioning said member in its throw in each direction.

5. Packing and weighing apparatus including a delivery chute terminating in spaced spouts, weighing means disposed adjacent said spouts, a rock shaft extending upwardly through the chute, a gate carried by said shaft within the chute and movable by the shaft to deflect material to said spouts alternately, a rod extending transversely of the spouts adjacent the lower end of said shaft, a sleeve slidable on said rod, and an operative connection between the sleeve and the shaft whereby the sleeve may be reciprocated for turning the shaft on its axis.

6. Packing and weighing apparatus including a delivery chute terminating in spaced spouts, weighing means disposed adjacent said spouts, a rock shaft extending upwardly through the chute, a gate carried by said shaft within the chute and movable by the shaft to deflect material to said spouts alternately, a driven shaft terminating adjacent the lower end of said rock shaft, a slidably mounted member adapted to be reciprocated transversely of the chute between the adjacent ends of said shafts and operatively connected to the shafts for turning the rock shaft on its axis as the driven shaft is rotated, and means for intermittently rotating the driven shaft.

7. Packing and weighing apparatus including a delivery chute terminating in spaced spouts, a rock shaft extending upwardly through the chute, a gate carried by said shaft within the chute and movable by the shaft to deflect material to said spouts alternately, a drive shaft, an aligned driven shaft terminating adjacent the lower end of said rock shaft, a sleeve slidably reciprocable transversely of the chute between the adjacent ends of said shafts, means operatively connecting the sleeve with said shafts for turning the rock shaft on its axis as the driven shaft is rotated, a clutch between said drive shaft and the driven shaft constantly urged to automatically connect said drive and driven shafts to turn in unison, weighing platforms adjacent the spouts, and means actuated by said platforms for intermittently rendering the clutch inactive.

HARVEY KING.
LELAND WYSE.